(12) United States Patent
Holstine et al.

(10) Patent No.: US 12,037,123 B2
(45) Date of Patent: Jul. 16, 2024

(54) EJECTION SEAT HANDLE SEPARATION

(71) Applicant: ROCKWELL COLLINS, INC., Cedar Rapids, IA (US)

(72) Inventors: Steve A. Holstine, Peyton, CO (US); Mayur K. Vadhwana, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 260 days.

(21) Appl. No.: 17/841,244

(22) Filed: Jun. 15, 2022

(65) Prior Publication Data
US 2023/0406518 A1 Dec. 21, 2023

(51) Int. Cl.
*B64D 25/10* (2006.01)

(52) U.S. Cl.
CPC .................... *B64D 25/10* (2013.01)

(58) Field of Classification Search
CPC ...... B64D 25/10; B64D 25/115; B64D 25/118
See application file for complete search history.

(56) References Cited

U.S. PATENT DOCUMENTS

| | | | | |
|---|---|---|---|---|
| 3,633,852 A | * | 1/1972 | Forman | B64D 25/10 244/122 A |
| 4,028,948 A | * | 6/1977 | Frost | G05G 17/00 74/2 |
| 5,573,205 A | * | 11/1996 | Arrone | B64D 25/10 74/89.17 |
| 2020/0130852 A1 | * | 4/2020 | Marutzky | B64D 17/725 |
| 2021/0323684 A1 | | 10/2021 | Wilson et al. | |
| 2021/0347463 A1 | * | 11/2021 | Walter | B64D 25/10 |
| 2023/0063264 A1 | | 3/2023 | Wimmer et al. | |

FOREIGN PATENT DOCUMENTS

| | | |
|---|---|---|
| CN | 202807100 | 3/2013 |
| GB | 704332 | 2/1954 |
| GB | 1567385 | 5/1980 |

OTHER PUBLICATIONS

United Kingdom Intellectual Property Office, United Kingdom Search Report dated Oct. 31, 2023 in Application No. GB2308858.6.

* cited by examiner

*Primary Examiner* — Justin M Benedik
(74) *Attorney, Agent, or Firm* — SNELL & WILMER L.L.P.

(57) ABSTRACT

An ejection handle separation system is disclosed herein. The ejection handle separation system includes an ejection seat handle, a rotatable component, a cable connected to the handle and coupled to the rotatable component, wherein the rotatable component rotates in response to pulling the ejection seat handle, and an anchor inserted into the rotatable component and configured to releasably connect the cable to the rotatable component.

20 Claims, 14 Drawing Sheets

EJECTION SEAT HANDLE SEPARATION

FIELD

The present disclosure generally relates ejection seats, and more specifically, to ejection seat handle separation.

BACKGROUND

Ejection seats are used to remove pilots from aircraft. Once the pilot and the ejection seat have left the aircraft, they begin free fall at a predetermined altitude or time, depending on mode, the seat and pilot separate from each other. Currently training for pilots includes instructions to hold on to the handle firmly and not let go until seat aircrew separation. This is to reduce arm flail injuries. However, upon seat aircrew separation the handle is still attached to the seat and has potential to cause injury to the pilot if they are still grasping the handle firmly.

SUMMARY

An ejection handle separation system is disclosed herein. The ejection handle separation system includes an ejection seat handle, a rotatable component, a cable connected to the handle and coupled to the rotatable component, wherein the rotatable component rotates in response to pulling the ejection seat handle, and an anchor inserted into the rotatable component and configured to releasably connect the cable to the rotatable component.

In various embodiments, the anchor is configured to detonate to release the cable from the rotatable component. In various embodiments, the detonation of the anchor occurs in response to a trigger. In various embodiments, the anchor includes an inner barrel coupled to the cable, an outer barrel disposed around an outside perimeter of the inner barrel, and a heat source disposed around an outside perimeter of the outer barrel, the heat source configured to rapidly apply heat to the outer barrel causing the outer barrel to expand so that the inner barrel slips out of the outer barrel.

In various embodiments, the rotatable component further includes a cavity configured to receive and hold the anchor and a machined channel extending from the cavity to an external surface of the rotatable component. In various embodiments, the cable further includes a ball end configured sized to slide through the machined channel in response to the anchor being removed from the rotatable component. In various embodiments, the anchor is configured to be pulled from rotatable component in response to pulling the ejection seat handle. In various embodiments, the ejection handle separation system further includes a cam configured to rotate in response to the ejection seat handle being pulled, the cam further configured to remove the anchor.

Also disclosed herein is an ejection handle separation system including an ejection handle, a rotatable component including a machined channel formed therein, a cable connected at one end to the ejection handle and at an opposing end to the rotatable component, the cable releasably secured to the rotatable component, and a stationary component disposed over the rotatable component including over the machined channel, the stationary component preventing the cable from separating from the rotatable component when in a first state, wherein the stationary component allows the cable to separate from the rotatable component when in a second state.

In various embodiments, the stationary component includes an opening disposed over the machined channel, the cable separating from the rotatable component through the opening. In various embodiments, the first state corresponds to a first position of the rotatable component with respect to the stationary component and the second state corresponds to second position of the rotatable component with respect to the stationary component. In various embodiments, the second position is reached after initiating an ejection sequence.

In various embodiments, the rotatable component further includes a cavity configured to releasably secure the cable to the rotatable component. In various embodiments, the cable further includes a ball end disposed in the cavity and preventing the cable from separating from the rotatable component.

Also disclosed herein is an ejection seat handle separation system including an ejection handle, a cable, having a first end and an opposing second end, the first end connected to the handle, a rotatable component configured to receive and secure the second end of the cable, and a handle separation device configured to release the ejection handle in response to a trigger. In various embodiments, the ejection handle separation system further includes a cutter having a hole formed therein, the cable passing through the hole, wherein the cutter is configured to sever the cable within the hole. In various embodiments, the ejection handle separation system further includes blade disposed within the cutter and a ballistic cartridge disposed within the cutter, the ballistic cartridge configured to move the blade to sever the cable.

In various embodiments, the ejection handle separation system further includes a pin assembly including a U-shaped component coupled to an inverted T component, the U-shaped component being coupled to the second end of the cable and the inverted T component being connected to the first end of the cable. In various embodiments, the pin assembly is configured to break in response to an application of force to the first end of the cable. In various embodiments, the handle separation device is external to the rotatable component.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
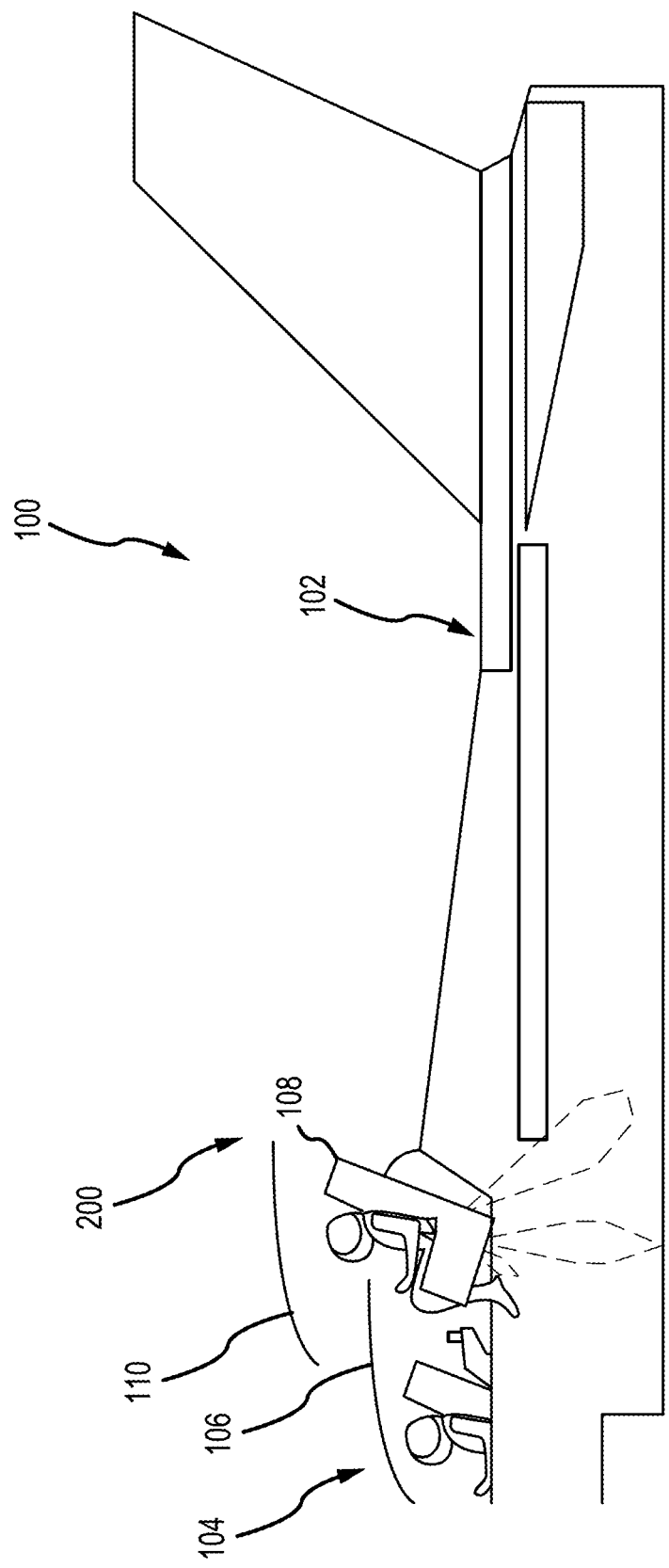
FIG. 1 illustrates an aircraft having two cockpits with respective ejection systems and a system for adjusting settings of the ejection systems, in accordance with various embodiments.

Referring now to FIG. 1, in accordance with various embodiments, an aircraft 100 may include a fuselage 102. Fuselage 102 may define or include a cockpit 104 in which one or more member of a flight crew may be located. Fuselage 102 may further define or include a second cockpit 108 in which one or more member of a flight crew may be located. In various embodiments, cockpit 104 may include one or more ejection systems to facilitate ejection of one or more members of the flight crew. In that regard, first cockpit 104 may include a hatch or canopy 106 that separates from or moves relative to first cockpit 104 to allow the member or members of the flight crew in first cockpit 104 to eject from fuselage 102. Second cockpit 108 may further include a hatch or canopy 110 that separates from or moves relative to second cockpit 108 to allow the member or members of the flight crew in second cockpit 108 to eject from fuselage 102. Aircraft 100 may be a passenger aircraft, a cargo aircraft, a military aircraft, or the like.

Figure 2B:
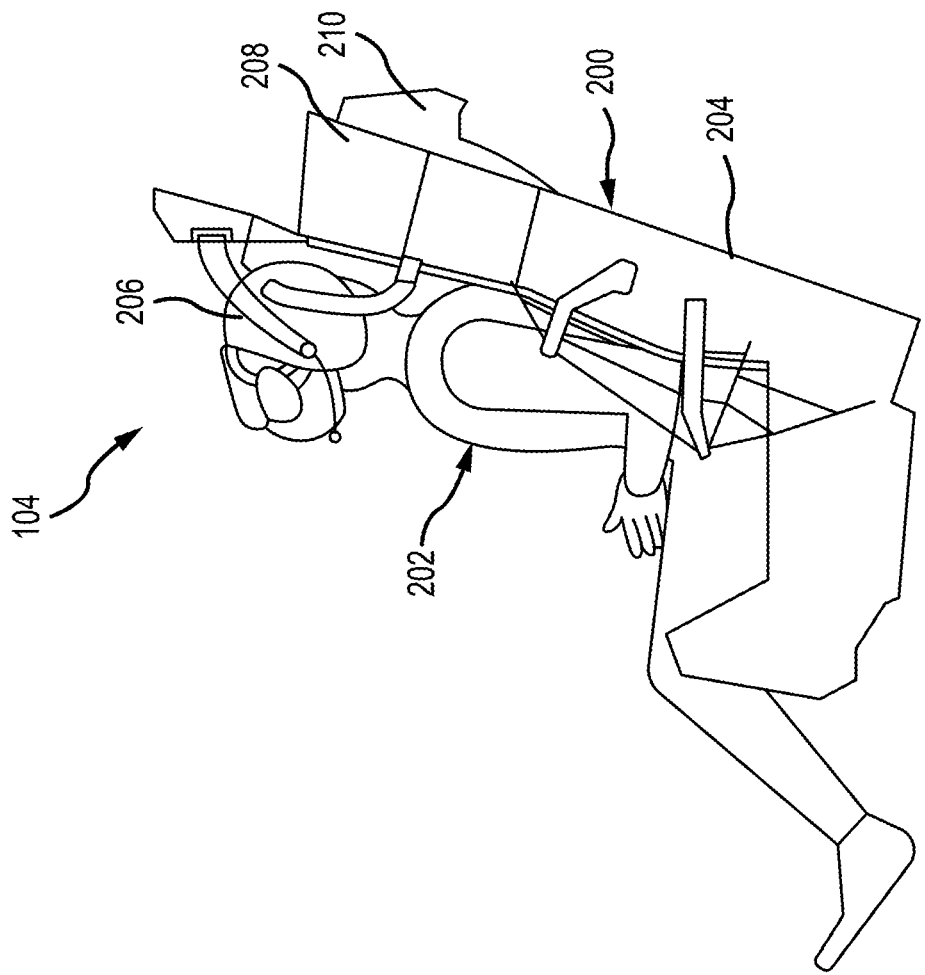
FIGS. 2A and 2B illustrate a front view and a side view, respectively, of various features of an ejection system including an ejection seat, in accordance with various embodiments.
Figure 2A:
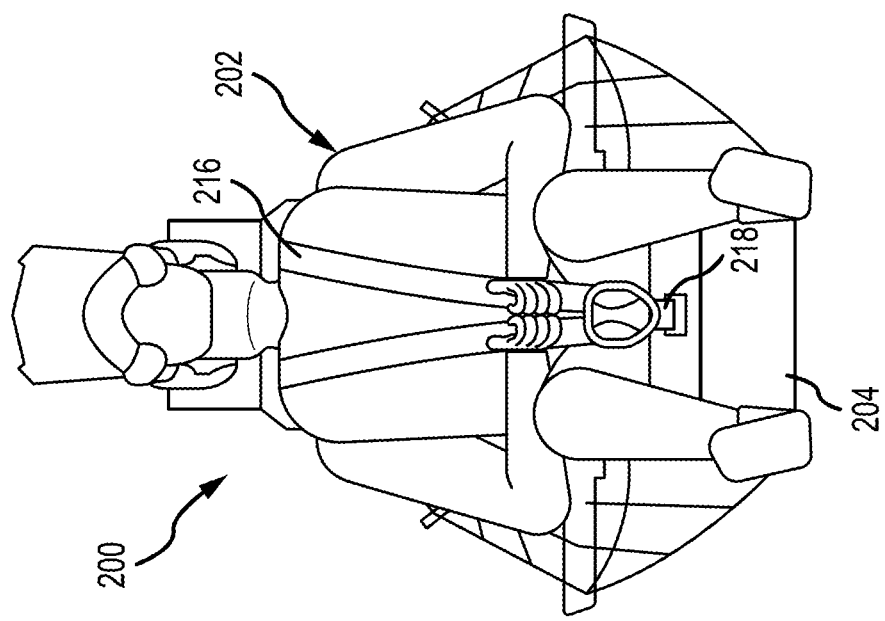

Referring now to FIGS. 2A and 2B, in accordance with various embodiments, an ejection system 200 may be included in cockpit 104, with momentary reference to FIG. 1. In particular, ejection system 200 may include a seat 204 on which a user 202 may sit or otherwise rest and a helmet 206 which may be supported on a head of the user 202. Seat 204 may include various components of the ejection system 200 such as a main parachute 208 and a drogue 210. Seat 204 may further include a catapult or rocket that ejects seat 204 and any occupant thereof from cockpit 104. Drogue 210 may be a parachute that initially deploys after ejection of seat 204 and may reduce a velocity of seat 204 as it travels towards a ground surface. Main parachute 208 may deploy after drogue 210 and may provide further reduction of the velocity of at least one of seat 204 or user 202 as it travels towards the ground surface. Seat 204 may further include a harness 216 that restrains user 202 in seat 204.

Seat 204 may further include a handle 218 that activates the catapult or rocket in response to being pulled. In various embodiments, handle 218 may be a center pull handle located between the legs of user 202. In various embodiments, handle 218 may be a side pull handle located near the outside of one or both legs, User 202 may hold onto handle 218 after seat 204 is ejected from aircraft 100 up until main parachute 208 is deployed and seat 204 separates from user 202. Handle 218 may remain connected to seat 204 after the separation of user 202 from seat 204. In such cases, injury to user 202 may occur. Disclosed herein are systems and mechanisms for separating handle 218 from 202 to prevent injury to user 202.

Figure 3:
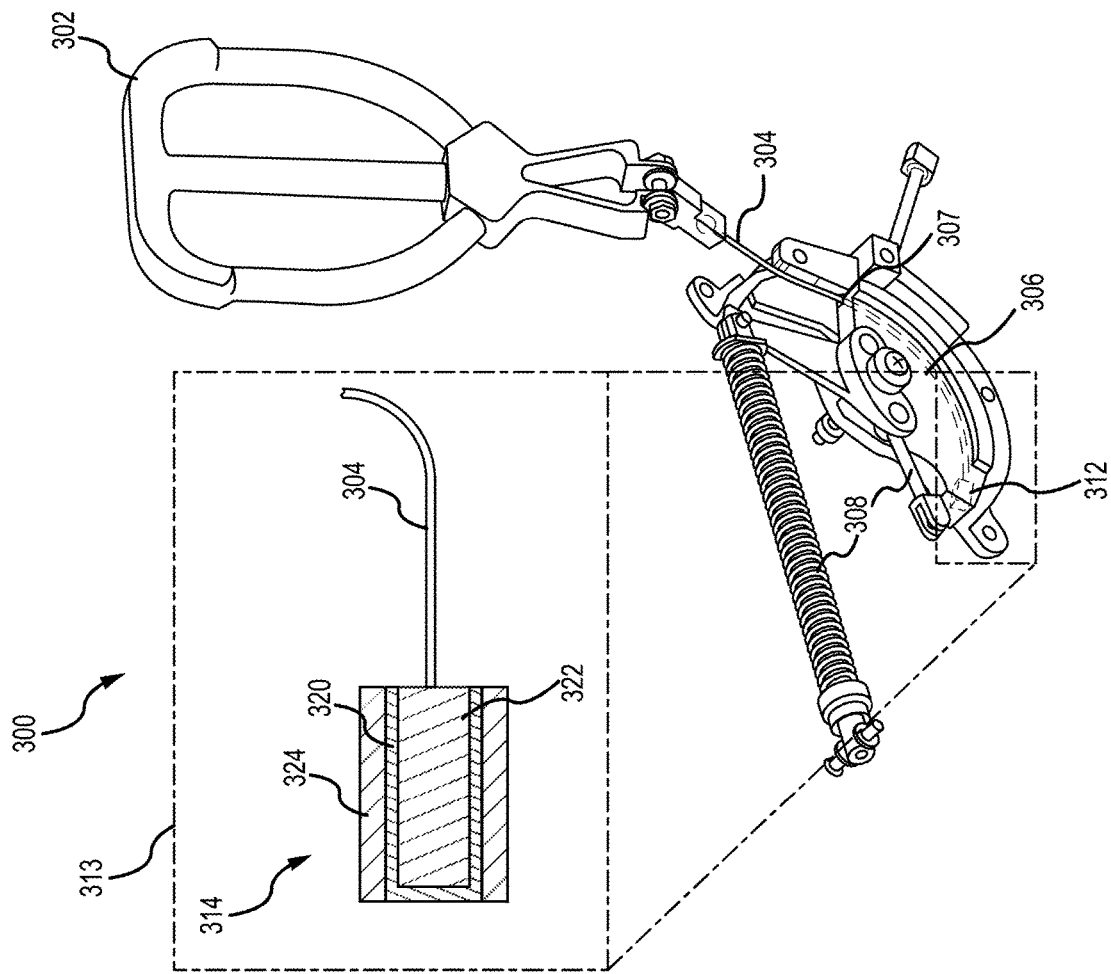
FIG. 3 illustrates an ejection seat handle separation system, in accordance with various embodiments.

Referring now to FIG. 3, in accordance with various embodiments, an ejection handle seat separation system 300 is disclosed. System 300 includes a handle 302, a cable 304, a rotatable component 306, and initiation bars 308. Handle 302 may be an example of handle 218 described above with respect to FIGS. 2A and 2B. Handle 302 is a center pull handle located between the legs of user 202 and is connected to seat 204. Handle 302 is coupled to cable 304 configured to rotate component 306 in response to handle 302 being pulled by user 202. Initiation bars 308 activate the ejection of seat, primary ejection system such as a rocket catapult device, in response to the rotation of component 306.

Cable 304 is anchored within component 306 by an anchor 312. Anchor 312 is configured to secure cable 304 within component 306. In the depicted embodiment, anchor 312 is a separation system 314 for releasing cable 304 from component 306. A machined channel 307 is formed within component 306 providing a path for cable 304 to enter component 306 and connect to separation system 314. In various embodiments, as illustrated in call out box 313, separation system 314 includes an outer barrel 320 and an inner barrel 322. Outer barrel 320 is coupled, or anchored, to machined channel 307 of component 306. Inner barrel 322 is press fit into outer barrel 320. Inner barrel is connected to cable 304. In various embodiments, inner barrel 322 is press fit into outer barrel 320 using a thermal press fit procedure. For example, inner barrel 322 may be cooled and outer barrel 320 may be heated. The cooling causes inner barrel 322 to contract, or shrink, while the heating causing external barrel to expand, or grow. Inner barrel 322 is then press fit into outer barrel 320. Inner barrel 322 warms up, returning to normal size, and outer barrel 320 cools off, returning to normal size. A heat source 324 is then placed around the joined outer barrel 320 and inner barrel 322. The combination of heat source 324, outer barrel 320, and inner barrel 322 are then placed in component 306. This provides a strong, stable, and secure connection and anchor point for cable 304 within component 306.

During the ejection process, component 306 rotates in response to user 202 pulling handle 302, including cable 304 and anchor 312 (e.g., separation system 314), initiating the ejection sequence. The combination of heat source 324, outer barrel 320, and inner barrel 322 provide enough friction and resistance that cable 304 does not pull free and component 306 rotates as intended. Heat source 324 is triggered after ejection initiated in response to a trigger. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for heat source 324. Regardless of the trigger, heat source 324 rapidly heats up in response to the trigger. Heat source 324 may heat up on the order of milliseconds. For example, heat source 324 may achieve full heat in about 1 ms to about 50 ms, and more specifically, about 5 ms to about 15 ms. Outer barrel 320 expands in response to the rapid heating caused by heat source 324 allowing inner barrel 322 to slip out so that cable 304 exits component 306, effectively separating handle 302 from seat 204. Separating handle 302 from seat 204 during the seat aircrew separation process may reduce injuries sustained by user 202 when ejecting from aircraft 100.

Heat source 324 may be any type of rapidly heating heat source. For example, in various embodiments, heat source 324 may be an electric heat source powered by seat 204. In various embodiments, heat source 324 may be a ballistic heat source. In various embodiments, heat source 324 may be a chemical heat source. In the event that heat source 324 fails to activate, or does not cause handle 302 separation, the handle assembly (e.g., handle 302, cable 304, component 306, etc.) operates as it currently does.

Figure 4:
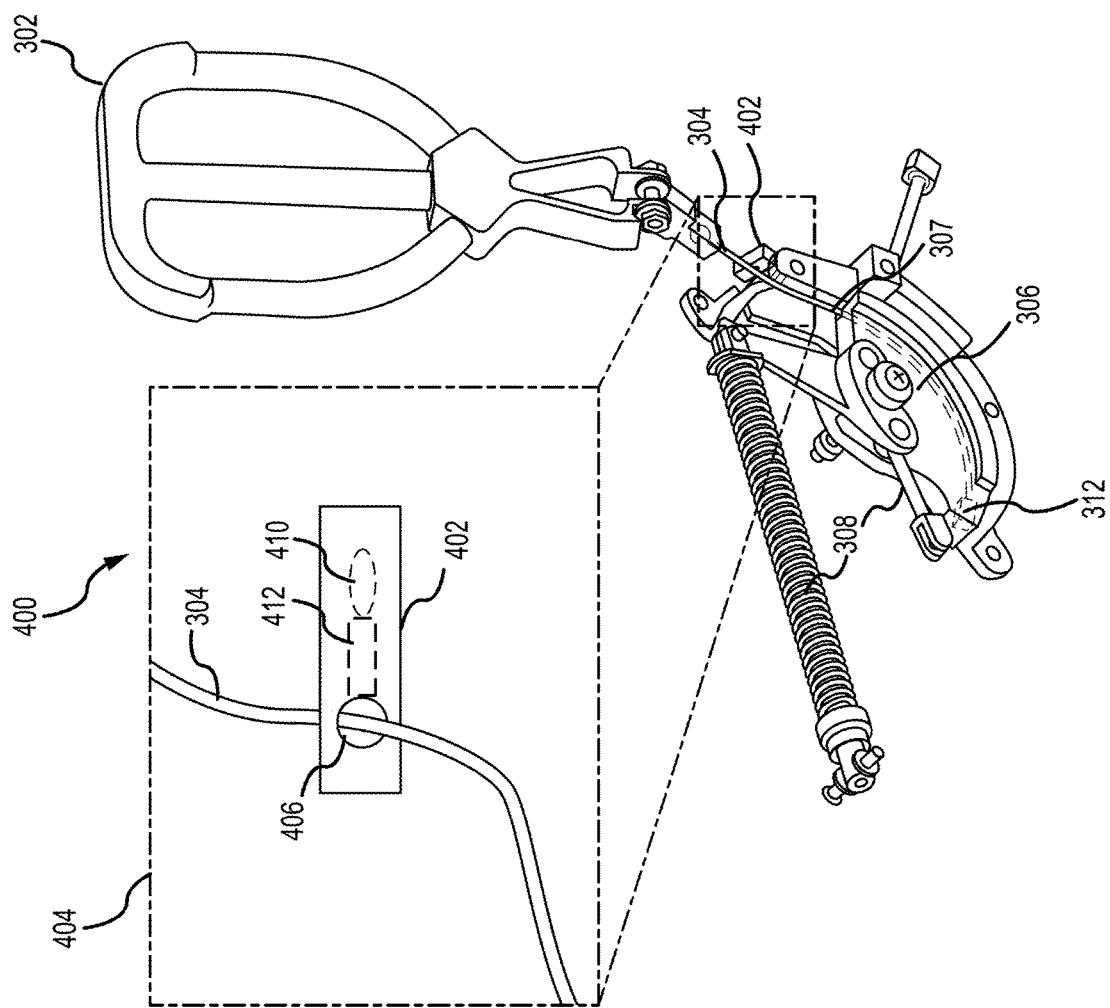
FIG. 4 illustrates an ejection seat handle separation system, in accordance with various embodiments.

Referring now to FIG. 4, in accordance with various embodiments, an ejection handle seat separation system 400 is disclosed. System 400 includes similar components to those describe above with respect to system 300 in FIG. 3 including handle 302, cable 304, component 306, machined channel 307, and anchor 312. Components described above with respect to FIG. 3 may not be repeated here. System 400 further includes a cutter 402 configured to cut cable 304. Call out box 404 provides a magnified view of cutter 402. As illustrated, cable 304 passes through an opening 406 in cutter 402. Cutter 402 is triggered after ejection initiated in response to a trigger. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for cutter 402. Regardless of the trigger, cutter 402 severs cable 304 in response to the trigger.

System 400 severs cable 304 between component 306 and handle 302. In various embodiments, cutter 402 may be a guillotine style device including sharp edges in opening 406 designed to sever cable 304. Cutter 402 may be coupled to component 306 or to another component of ejection system 200. After initiating the ejection sequence, cutter 402 may be activated, or moved, perpendicular to cable 304 so that the sharp edges of opening 406 sever cable 304.

In various embodiments, cutter may include a ballistic cartridge 410 that fires a knife 412 through cable 304, severing cable 304 and releasing handle 302. Ballistic cartridge 410 and knife 412 may be housed in the body of cutter 402. Knife 412 may be fired through a slot in the body of cutter 402 and across opening 406, severing cable 304 and releasing handle 302. In various embodiments, cutter 402 may include a spring and a blade (e.g., knife 412) housed inside the body of cutter 402. The spring may be released in response to the trigger, sending the blade across opening 406 and severing cable 304.

While system 400 is described above with respect to a center pull ejection system, cutter 402 may be used with a side pull ejection system. In a side pull ejection system, as described in further detail below with respect to FIG. 9B, handle 302 is connected to seat 204 by a hinge. In various embodiments, the hinge may pass through opening 406 of cutter 402. Cutter 402 may sever the hinge in response to a trigger. In such embodiments, a stronger force (e.g., ballistic force) may be used to sever the hinge.

Figure 5:
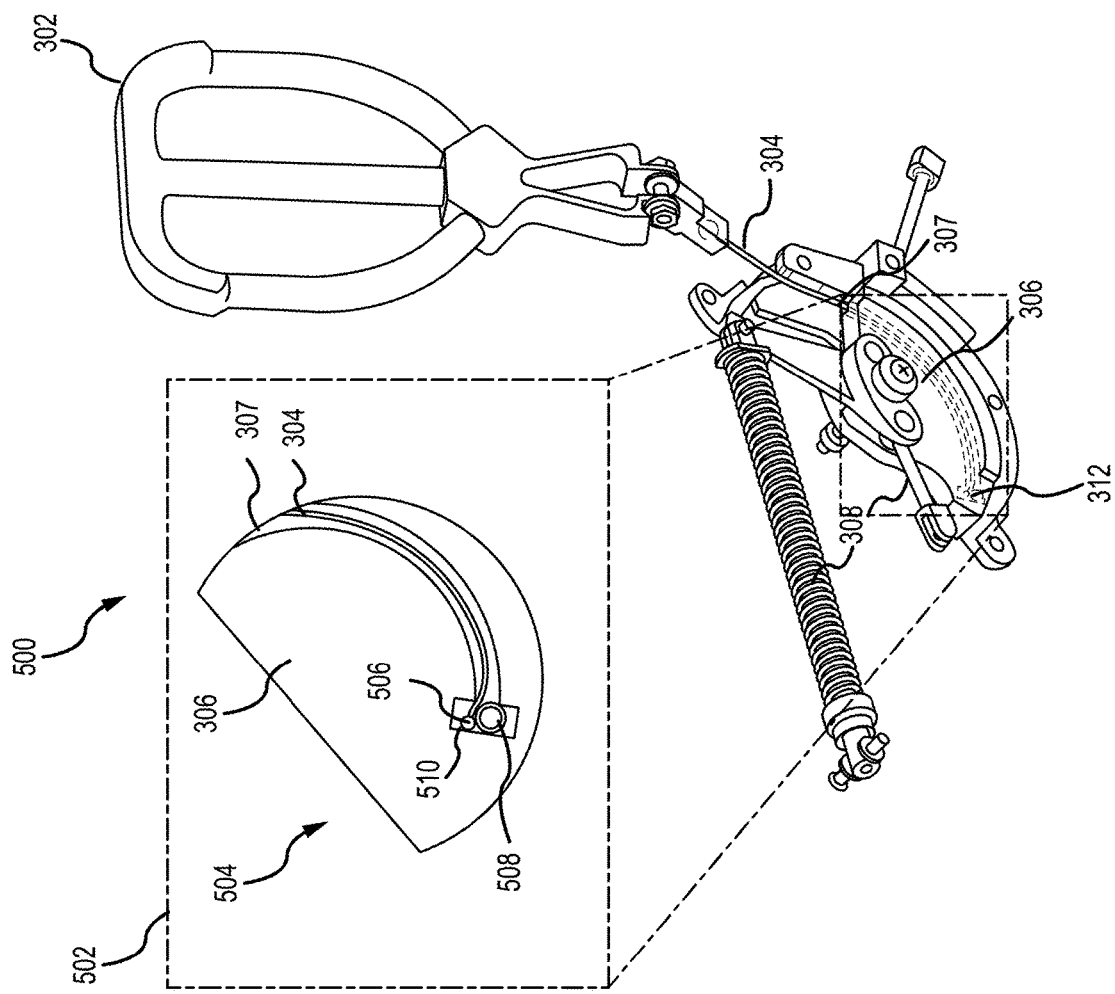
FIG. 5 illustrates an ejection seat handle separation system, in accordance with various embodiments.

Referring now to FIG. 5, in accordance with various embodiments, an ejection handle seat separation system 500 is disclosed. System 500 includes similar components to those describe above with respect to system 300 in FIG. 3 including handle 302, cable 304, component 306, machined channel 307, and anchor 312. Components described above with respect to FIG. 3 may not be repeated here. System 500 further includes separation mechanism 504 as shown in call out 502. Call out 502 illustrates a cross section of component 306 including machined channel 307, cable 304, a ball end 506 of cable 304, and an explosive bolt 508.

Cable 304, including ball end 506 are placed into component 306 through machine channel 307 and into a cavity 510 formed at the end of machined channel 307. Machined channel 307 is formed to be wider than ball end 506, allowing cable 304 to be passed into component 306 during manufacture and assembly. Explosive bolt 508 is placed through cavity 510 and blocking machined channel 307 so that ball end 506 cannot pass explosive bolt 508 and enter machined channel 307. Explosive bolt 508 is inserted into component 306 and cavity 510 perpendicular to the axis of rotation of component 306.

Explosive bolt 508 is triggered after ejection initiated in response to a trigger. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for explosive bolt 508. Regardless of the trigger, explosive bolt 508 is activated to free ball end 506 to exit component 306 through machined channel 307. In various embodiments, explosive bolt 508 is forced out of component 306 along the axis of insertion (i.e., perpendicular to the axis of rotation). In various embodiments, explosive bolt 508 detonates in place providing a path for ball end 506 and cable 304 to exit component 306 and freeing handle 302.

In various embodiments, explosive bolt 508 may be replaced with a bolt. Bolt 508 may perform the same function as explosive bolt 508, that is, preventing ball end 506 from exiting cavity 510. In such embodiments, and explosive mechanism may be triggered to force bolt 508 out of component 306 in a similar manner to that described above.

Figure 6:
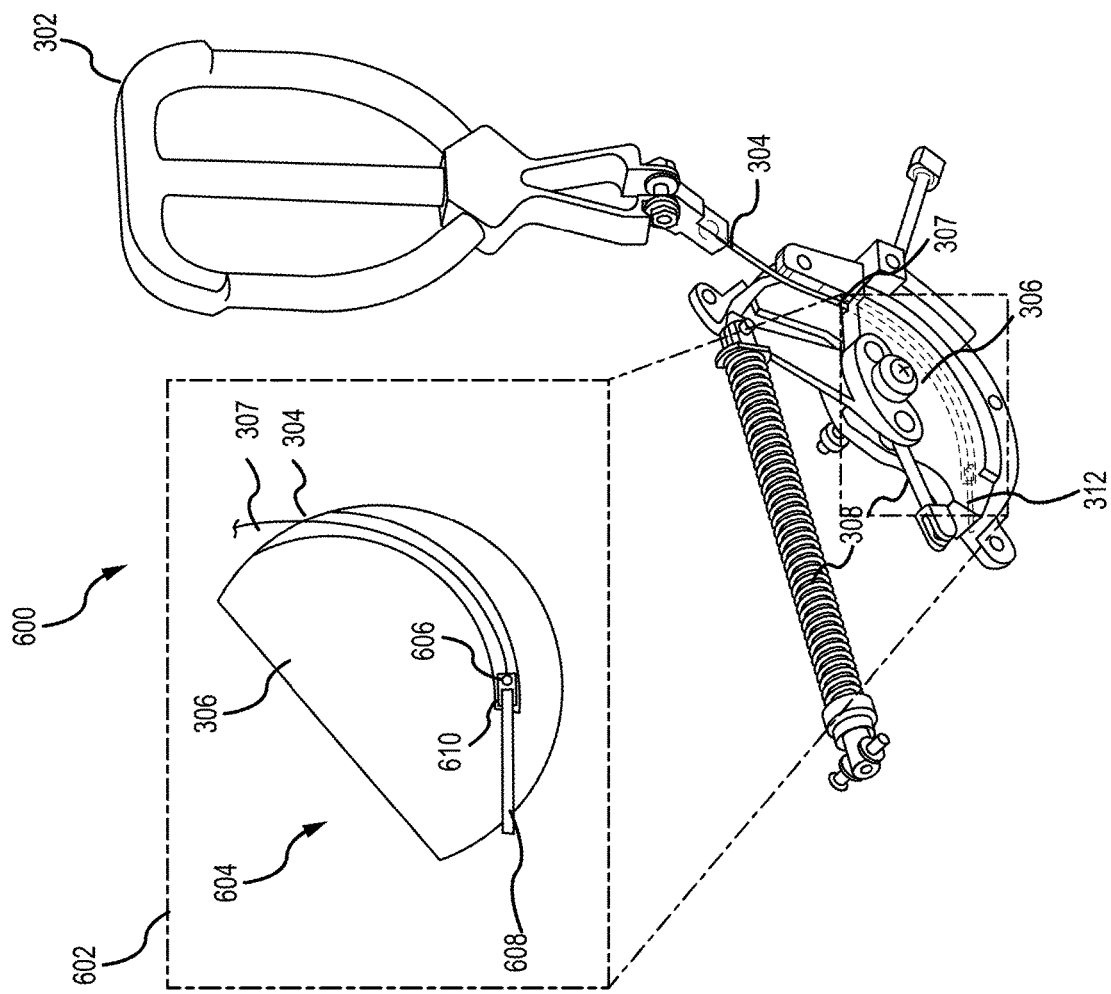
FIG. 6 illustrates an ejection seat handle separation system, in accordance with various embodiments.

Referring now to FIG. 6, in accordance with various embodiments, an ejection handle seat separation system 600 is disclosed. System 600 includes similar components to those describe above with respect to system 300 in FIG. 3 including handle 302, cable 304, component 306, machined channel 307, and anchor 312. Components described above with respect to FIG. 3 may not be repeated here. System 600 further includes separation mechanism 604 as shown in call out 602. Call out 602 illustrates a cross section of component 306 including machined channel 307, cable 304, a ball end 606 of cable 304 held in place by an anchor 610, and an explosive bolt 608.

Cable 304, including ball end 606 are placed into component 306 through machine channel 307 and held in place by explosive bolt 608 at the end of machined channel 307. Explosive bolt 608 enters component 306 in the same plane as machined channel 307. Machined channel 307 is formed to be wider than ball end 606, allowing cable 304 to be passed into component 306 during manufacture and assembly. Explosive bolt 608 secures anchor 610 in place preventing ball end 606 from entering machined channel 307 and exiting component 306.

Explosive bolt 608 is triggered after ejection initiated in response to a trigger. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for explosive bolt 608. Regardless of the trigger, explosive bolt 608 is activated to free ball end 606 to exit component 306 through machined channel 307. In various embodiments, explosive bolt 608 is forced out of component 306 along the axis of insertion (i.e., in the same plane as machined channel 307). In various embodiments, explosive bolt 608 detonates in place freeing ball end 606 from anchor 610 and allowing ball end 606 and cable 304 to exit component 306 thereby freeing handle 302.

Figure 7:
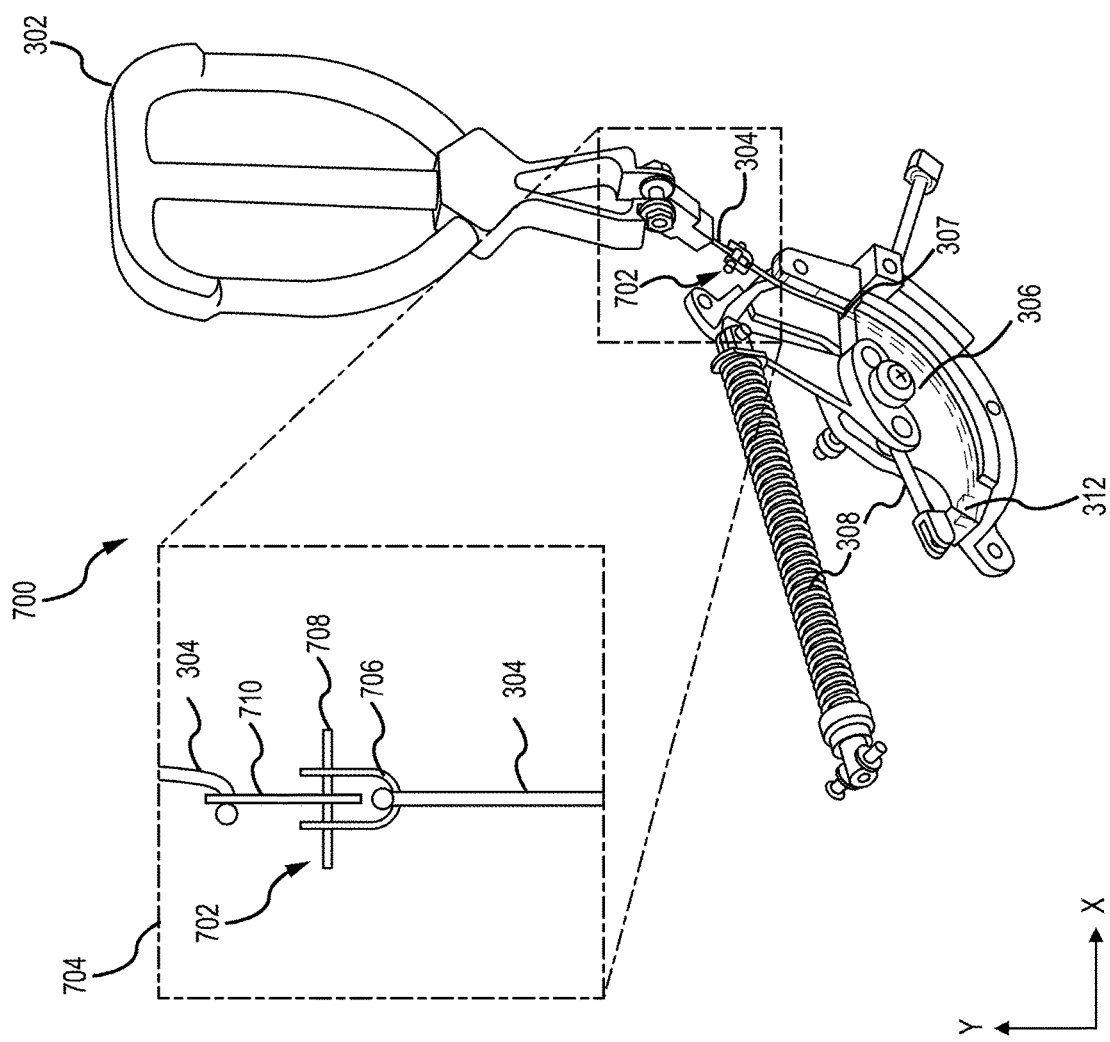
FIG. 7 illustrates an ejection seat handle separation system, in accordance with various embodiments.

Referring now to FIG. 7, in accordance with various embodiments, an ejection handle seat separation system 700 is disclosed. System 700 includes similar components to those describe above with respect to system 300 in FIG. 3 including handle 302, cable 304, component 306, machined channel 307, and anchor 312. Components described above with respect to FIG. 3 may not be repeated here. System 700 further includes pin assembly 702 as shown in call out 704. Call out 704 illustrates a cross section of pin assembly 702 including a straddle component 706, a cross bar 708, and a vertical bar 710.

As illustrated, straddle component 706 has a U-shape with two vertical legs extending upward (e.g., the y-direction). Each leg of straddle component 706 has a hole formed therein and the base of straddle component 706 has another hole. The base of straddle component secures cable 304. Vertical bar 710 is located vertically (e.g., the y-direction) between the legs of straddle component 706. Vertical bar 710 has two holes, one at each end. A first hole secures cable 304 and a second hole is disposed between the holes of the legs of straddle component 706. Cross bar 708 passes through the holes in the legs of straddle component 706 and the second hole of vertical bar 710, forming pin assembly 702.

Cross bar 708 may be made from steel, aluminum, plastic, composite, or another material that will break under stress. Pin assembly 702, including cross bar 708, may be designed to support the stress of user 202 pulling handle 302 without breaking while still breaking under the force of the seat aircrew separation event. In various embodiments, the forced used to break pin assembly 702 is more than the force needed to trigger ejection and less than a force that would harm user 202. In various embodiments, pin assembly 702 is not triggered and instead breaks under the force of normal use, freeing handle 302. In the event that pin assembly 702 does not break as intended, the handle 302 and ejection system 200 perform as is current practice. In various embodiments, cross bar 708 and vertical bar 710 are a unitary piece forming an inverted T shape that is inserted into straddle component 706.

In various embodiments, pin assembly 702 may further include a ballistic or explosive device that breaks pin assembly 702, freeing handle 302. In various embodiments, the ballistic, or explosive, device may be triggered by an event during ejection. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for the ballistic or explosive component. Regardless of the trigger, the ballistic, or explosive, device severs pin assembly 702 freeing handle 302 in response to the trigger.

Figure 8A:
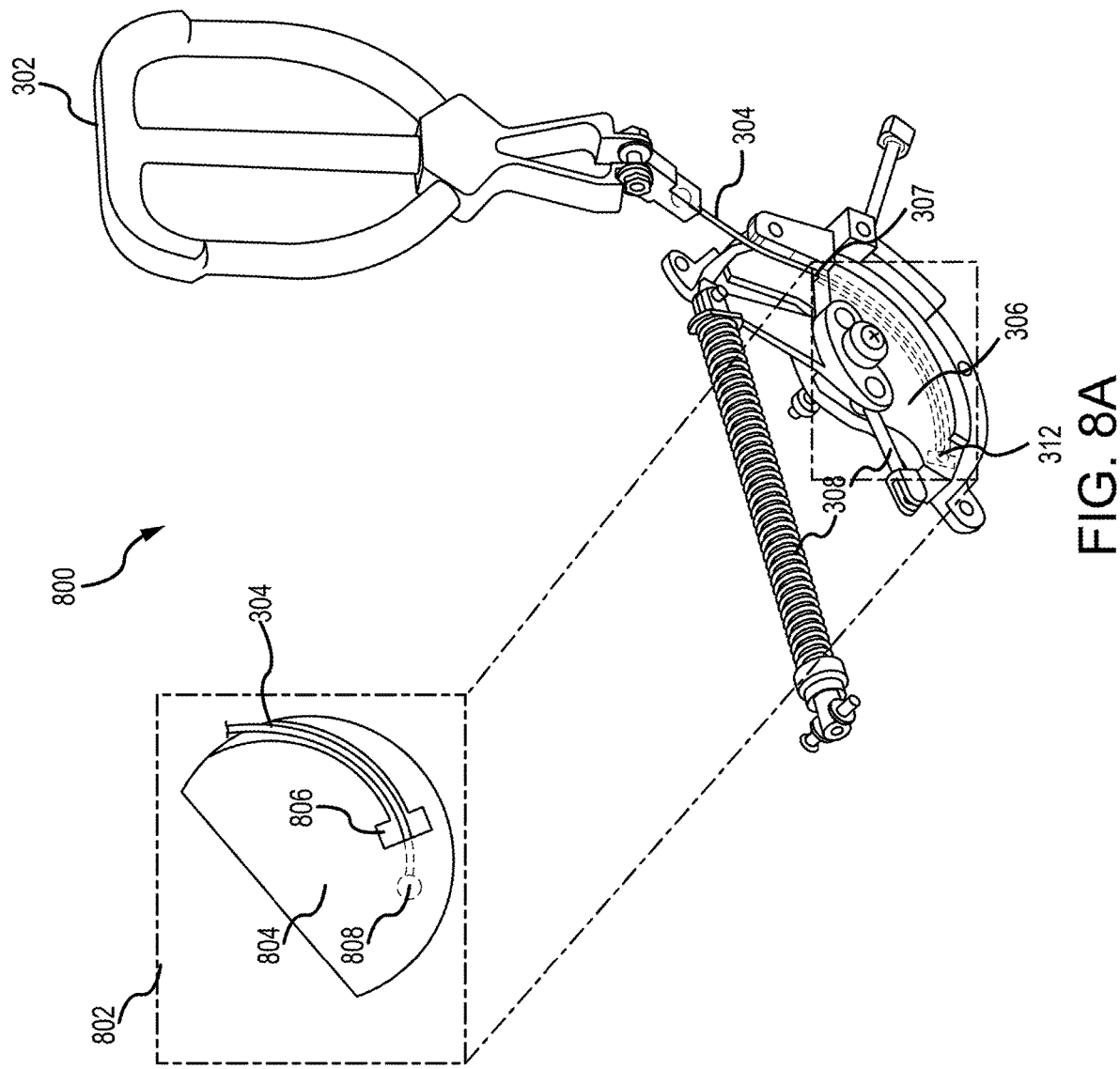
FIGS. 8A, 8B, 8C, and 8D illustrate an ejection seat handle separation system, in accordance with various embodiments.
Figure 8B:
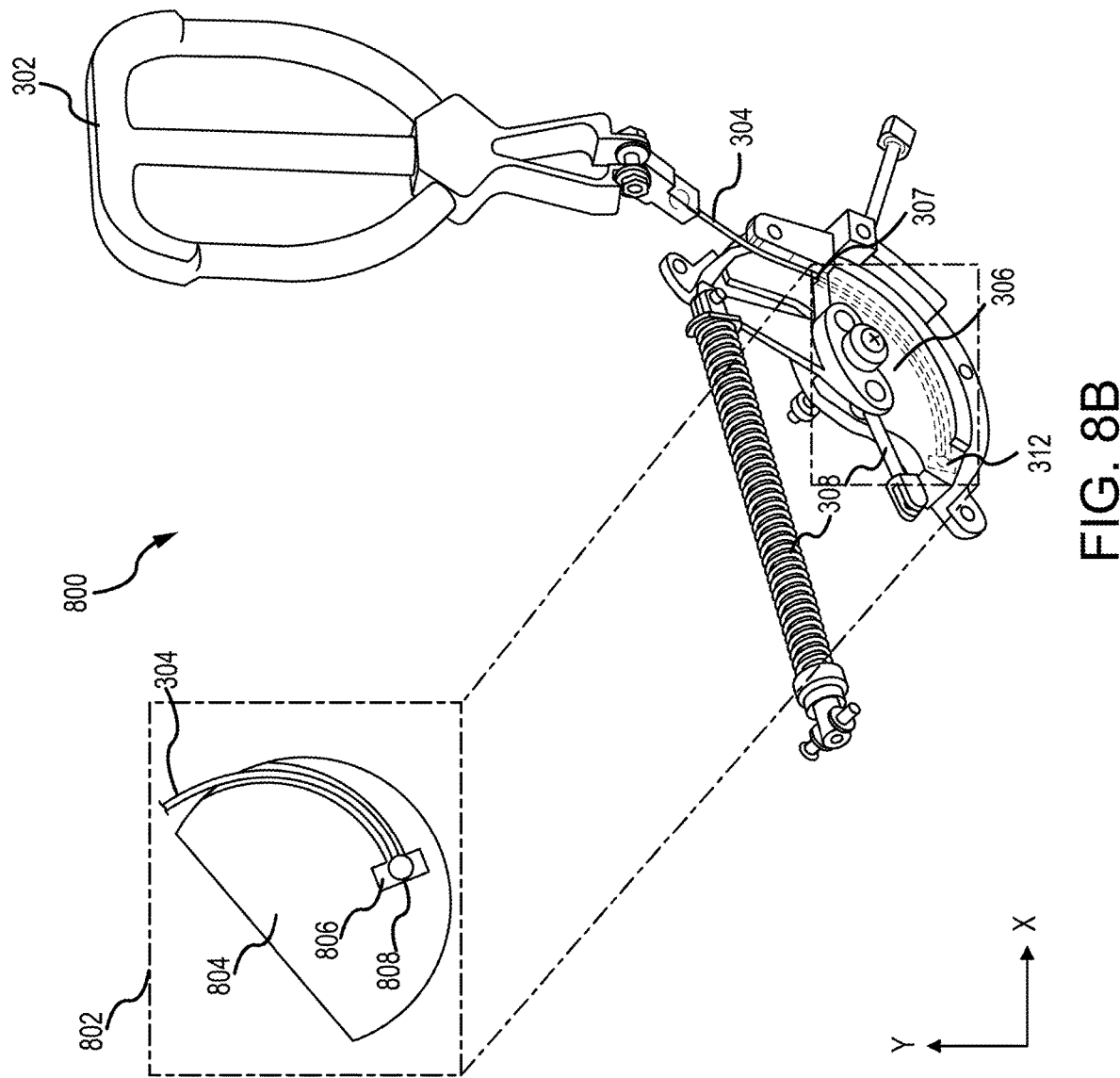
Figure 8C:
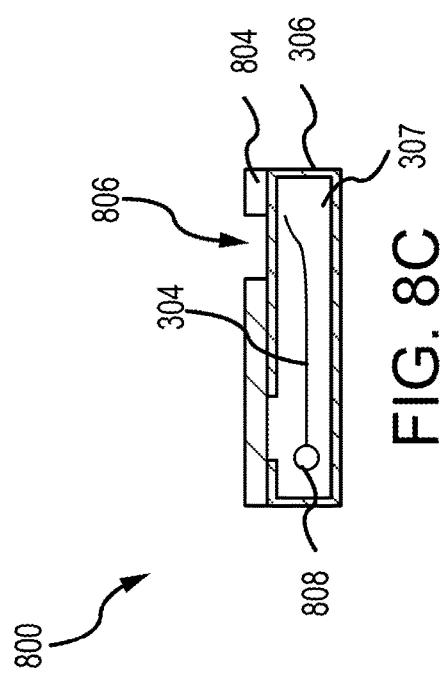
Figure 8D:
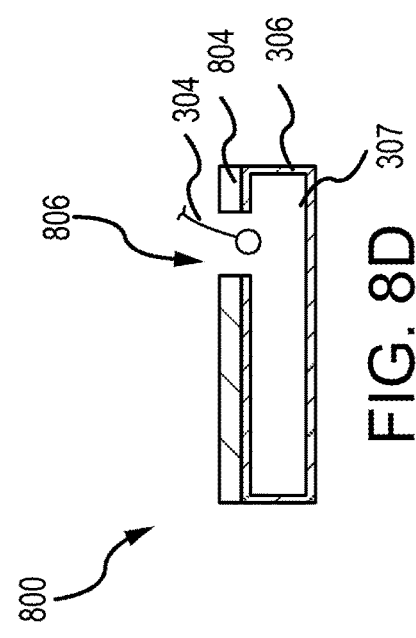

Referring now to FIGS. 8A-8D, in accordance with various embodiments, an ejection handle seat separation system 800 is disclosed. System 800 includes similar components to those describe above with respect to system 300 in FIG. 3 including handle 302, cable 304, component 306, machined channel 307, and anchor 312. Components described above with respect to FIG. 3 may not be repeated here. System 800 further includes a second component 804 disposed over component 306 as shown in FIGS. 8C and 8D.

FIGS. 8A and 8C illustrate, in various embodiments, component 306 and second component 804 in an initial state before activating the ejection system 200. In the initial state, cable 304 is located in machined channel 307 and anchored at 312. A ball end 808 of cable 304 is too large to pass through machined channel 307. Second component 804 is disposed over (e.g., the y-direction) component 306, as illustrated in FIG. 8C. Second component 804 has an opening 806 through which ball end 808 may pass. However, in the initial state opening 806 is not located over ball end 808, as illustrated in FIG. 8A.

To activate the ejection system, user 202 pulls handle 302 causing component 306 to rotated. Second component 804 remains stationary as component 306 rotates to activate the ejection system. This places system 800 in the ejection state, as illustrated in FIGS. 8B and 8D.

FIGS. 8B and 8D illustrate, in various embodiments, component 306 and second component 804 in the ejection state. That is, ejection has been initiated by rotating component 306. As illustrated in FIG. 8B, ball end 808 is now underneath opening 806 of second component 804, allow ball end 808, and cable 304, to exit component 306 and release handle 302. As illustrated in FIG. 8D, it can be seen that opening 806 aligns with machined channel 307 allowing ball end 808 to exit component 306. In various embodiments, the release of ball end 808 is allowed after pulling past the ejection state to ensure that the ejection sequence was properly triggered.

Figure 9:
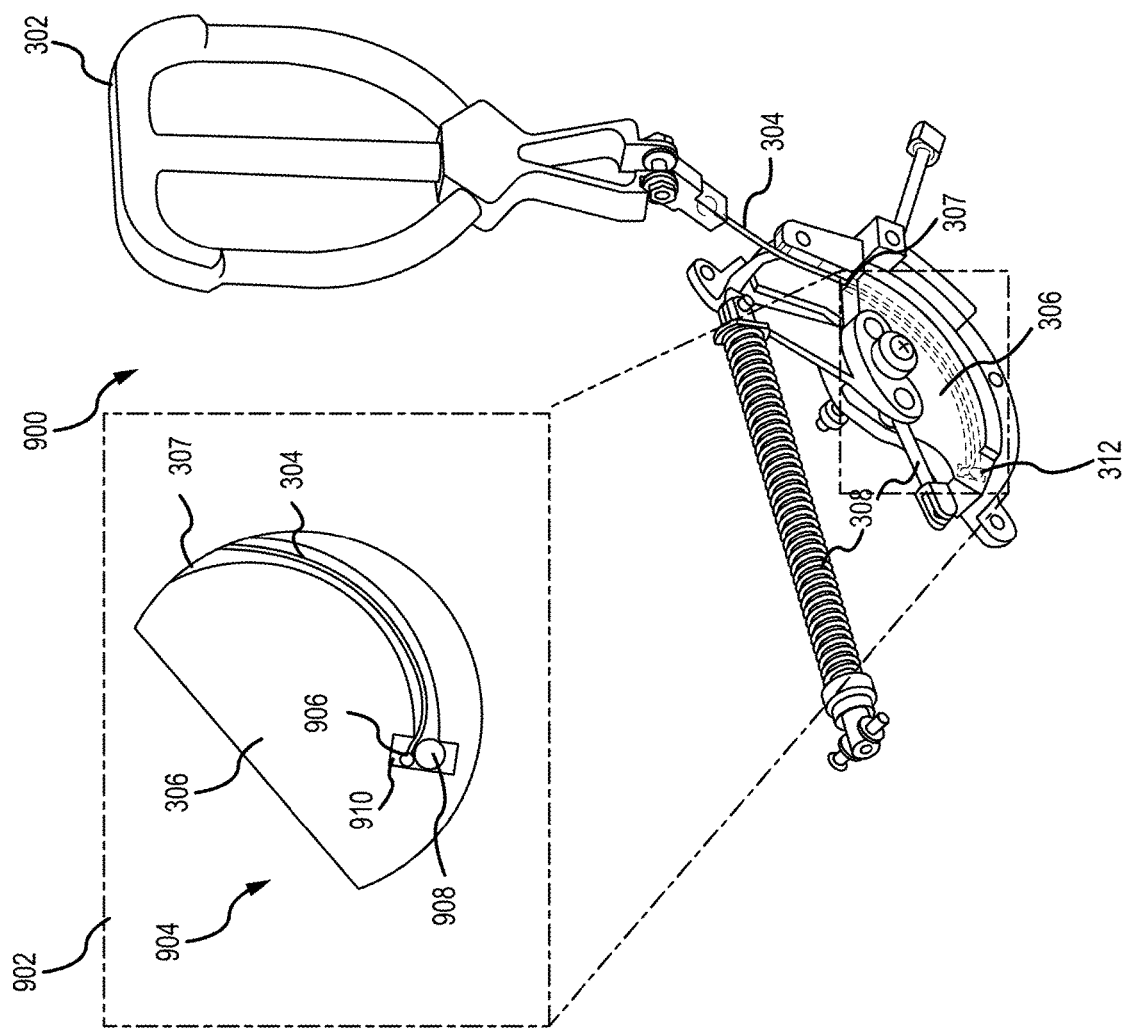
FIG. 9 illustrates an ejection seat handle separation system, in accordance with various embodiments.

Referring now to FIG. 9, in accordance with various embodiments, an ejection handle seat separation system 900 is disclosed. System 900 includes similar components to those describe above with respect to system 300 in FIG. 3 including handle 302, cable 304, component 306, machined channel 307, and anchor 312. Components described above with respect to FIG. 3 may not be repeated here. System 900 further includes separation mechanism 904 as shown in call out 902. Call out 902 illustrates a cross section of component 306 including machined channel 307, cable 304, a ball end 906 of cable 304, and a pin 908.

Cable 304, including ball end 906 are placed into component 306 through machine channel 307 and into a cavity 910 formed at the end of machined channel 307. Machined channel 307 is formed to be wider than ball end 906, allowing cable 304 to be passed into component 306 during manufacture and assembly. Pin 908 is placed through cavity 910 and blocking machined channel 307 so that ball end 906 cannot pass pin 908 and enter machined channel 307. Pin 908 is inserted into component 306 and cavity 910 perpendicular to the axis of rotation of component 306.

Pin 908 is removed after ejection is initiated in response to a trigger. In various embodiments, the trigger may be a timer. In various embodiments, the trigger may be the deployment of main parachute 208. In various embodiments, the trigger may be an altitude sensor. In various embodiments, the trigger may be seat aircrew separation. It is understood that anything could be used as a trigger for the pin 908. Regardless of the trigger, pin 908 is removed to free ball end 906 to exit component 306 through machined channel 307. In various embodiments, another component of ejection system 200 may remove pin 908. For example, a system that releases harness 216 may remove pin 908 at the same time and in response to the same trigger.

In various embodiments, an electromagnet or a solenoid may be used to remove pin 908. For example, a solenoid may be placed in-line with pin 908 to push pin 908 out of component. In various embodiments, pin 908 may be a piston of a solenoid that is retracted in response to the triggers previously described. Upon retraction, ball end 906 is able to exit component 306 through machined channel 307. The solenoid may be power by any source of power. In various embodiments, the solenoid may be powered by seat 204. In various embodiments, the solenoid may be powered by chemical batteries. In various embodiments, the solenoid may be powered by a capacitor that is charged during flight in the event of ejection.

Figure 10A:
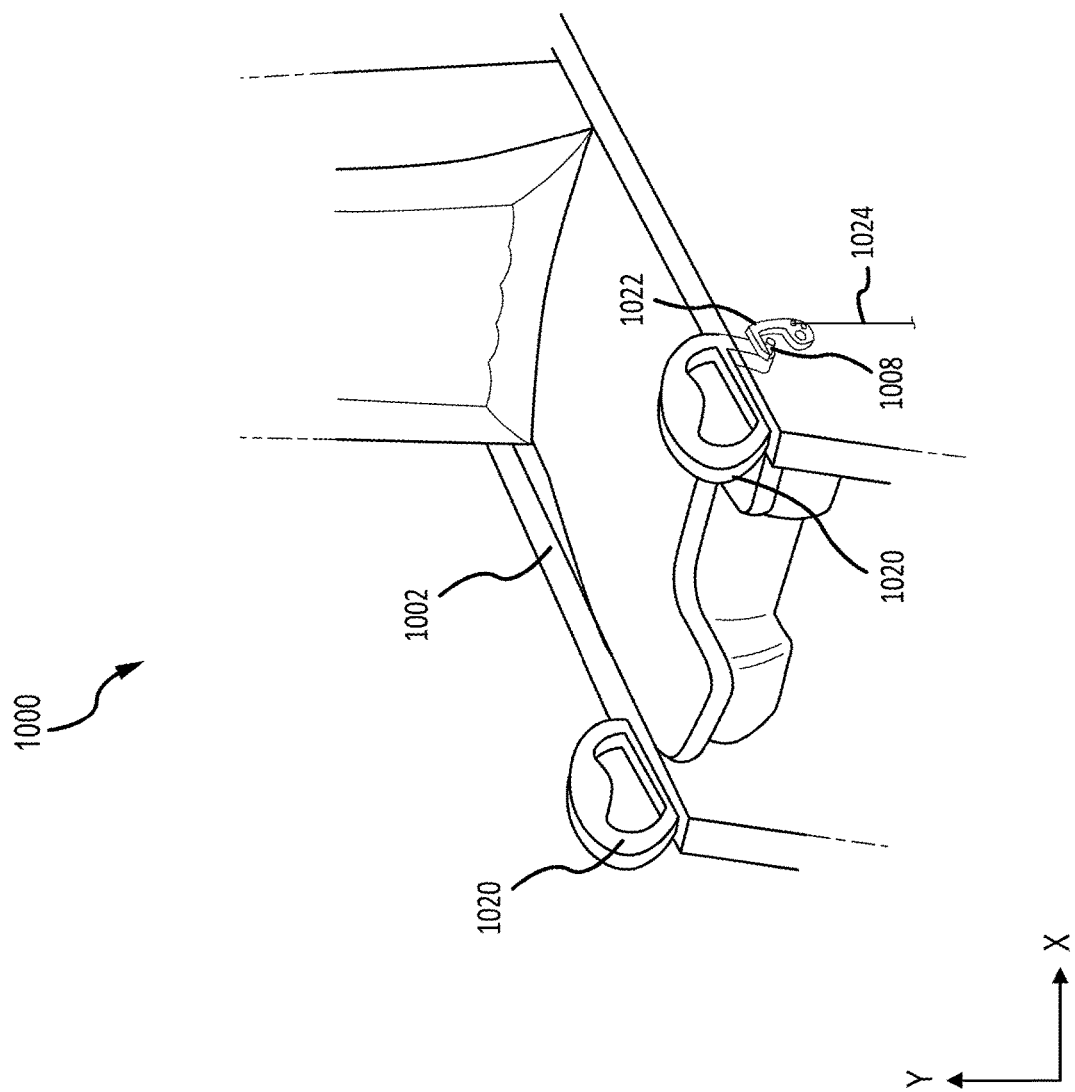
FIGS. 10A, 10B, and 10C illustrate an ejection seat handle separation system, in accordance with various embodiments.
Figure 10B:
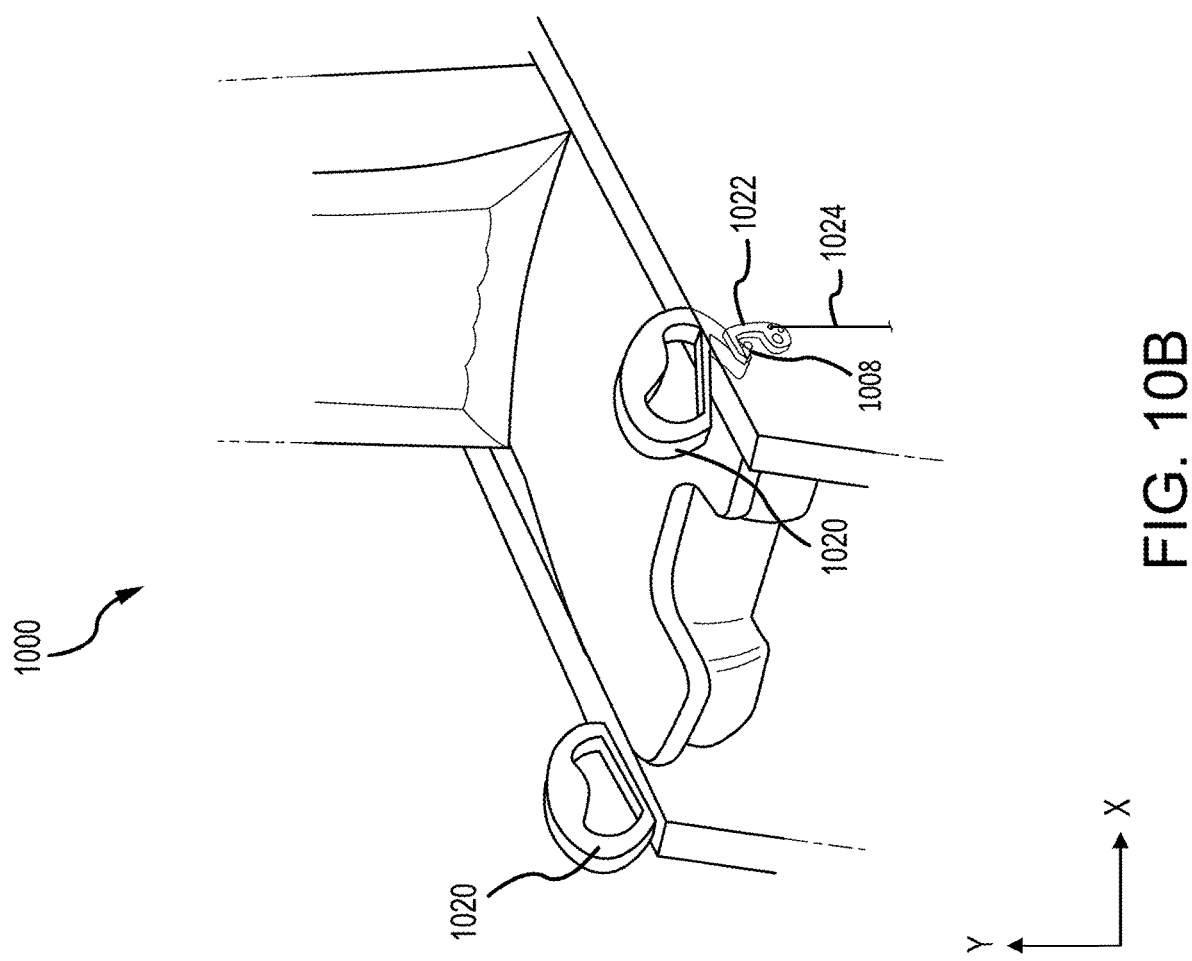

Referring now to FIGS. 10A-10B, in accordance with various embodiments, an ejection handle seat separation system 1000 is disclosed. Seat separation system 1000 includes a seat 1002, a pin 1008, a handle 1020, a cam 1022, and a cable 1024. Handle 1020 rotates about pin 1008. Cam 1022 secures pin 1008 within seat 1002 and thereby secures handle 1020 to seat 1002, as illustrated in FIG. 10A.

To initiate the ejection system, handle 1020 is pulled upward (e.g., the y-direction) causing handle 1020 to rotate clockwise (as depicted), or pivot, about pin 1008. Cam 1022 retains pin 1008 within seat 1002, securing handle 1020 to seat 1002 during the ejection initiation process, as depicted in FIG. 10B. This allows user 202 to initiate the ejection system as normal.

Figure 10C:
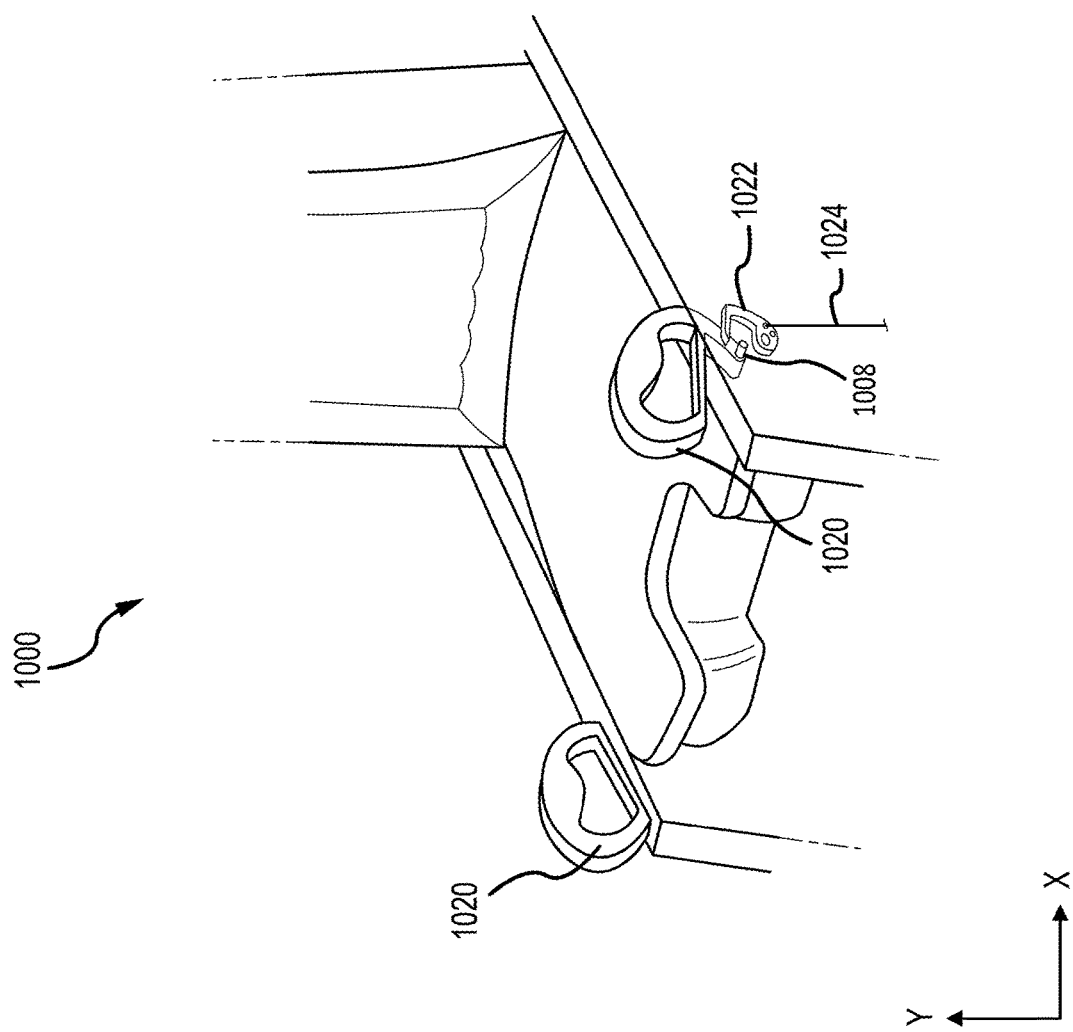

As illustrated in FIG. 10C, cable 1024 is pulled, rotating cam 1022 clockwise and disengaging cam 1022 from pin 1008. This releases pin 1008 from seat 1002 allowing handle 1020 to detach from seat 1002. In various embodiments, cable 1024 may be pulled using existing mechanisms for separating user 202 from seat 1022.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection handle separation system, comprising:
   an ejection seat handle;
   a rotatable component;
   a cable connected to the handle and coupled to the rotatable component, wherein the rotatable component rotates in response to pulling the ejection seat handle; and
   an anchor inserted into the rotatable component and configured to releasably connect the cable to the rotatable component.

2. The ejection handle separation system of claim 1, wherein the anchor is configured to detonate to release the cable from the rotatable component.

3. The ejection handle separation system of claim 2, wherein the detonation of the anchor occurs in response to a trigger.

4. The ejection handle separation system of claim 1, wherein the anchor includes:
   an inner barrel coupled to the cable;
   an outer barrel disposed around an outside perimeter of the inner barrel; and
   a heat source disposed around an outside perimeter of the outer barrel, the heat source configured to rapidly apply heat to the outer barrel causing the outer barrel to expand so that the inner barrel slips out of the outer barrel.

5. The ejection handle separation system of claim 1, wherein the rotatable component further comprises:
   a cavity configured to receive and hold the anchor; and
   a machined channel extending from the cavity to an external surface of the rotatable component.

6. The ejection handle separation system of claim 5, wherein the cable further includes a ball end configured sized to slide through the machined channel in response to the anchor being removed from the rotatable component.

7. The ejection handle separation system of claim 1, wherein the anchor is configured to be pulled from rotatable component in response to pulling the ejection seat handle.

8. The ejection handle separation system of claim 1, further comprising:
   a cam configured to rotate in response to the ejection seat handle being pulled, the cam further configured to remove the anchor.

9. An ejection handle separation system, comprising:
   an ejection handle;
   a rotatable component including a machined channel formed therein;
   a cable connected at one end to the ejection handle and at an opposing end to the rotatable component, the cable releasably secured to the rotatable component; and
   a stationary component disposed over the rotatable component including over the machined channel, the stationary component preventing the cable from separating from the rotatable component when in a first state, wherein the stationary component allows the cable to separate from the rotatable component when in a second state.

10. The ejection handle separation system of claim 9, wherein the stationary component includes an opening disposed over the machined channel, the cable separating from the rotatable component through the opening.

11. The ejection handle separation system of claim 9, wherein the first state corresponds to a first position of the rotatable component with respect to the stationary component and the second state corresponds to second position of the rotatable component with respect to the stationary component.

12. The ejection handle separation system of claim 11, wherein the second position is reached after initiating an ejection sequence.

13. The ejection handle separation system of claim 9, wherein the rotatable component further includes a cavity configured to releasably secure the cable to the rotatable component.

14. The ejection handle separation system of claim 13, wherein the cable further includes a ball end disposed in the cavity and preventing the cable from separating from the rotatable component.

15. An ejection seat handle separation system, comprising:
   an ejection handle;
   a cable, having a first end and an opposing second end, the first end connected to the handle;
   a rotatable component configured to receive and secure the second end of the cable; and
   a handle separation device configured to release the ejection handle in response to a trigger.

16. The ejection handle separation system of claim 15, further comprising:
   a cutter having a hole formed therein, the cable passing through the hole, wherein the cutter is configured to sever the cable within the hole.

17. The ejection handle separation system of claim 16, further comprising:
   blade disposed within the cutter; and
   a ballistic cartridge disposed within the cutter, the ballistic cartridge configured to move the blade to sever the cable.

18. The ejection handle separation system of claim 15, further comprising:
   a pin assembly including a U-shaped component coupled to an inverted T component, the U-shaped component being coupled to the second end of the cable and the inverted T component being connected to the first end of the cable.

19. The ejection handle separation system of claim 18, wherein the pin assembly is configured to break in response to an application of force to the first end of the cable.

20. The ejection handle separation system of claim 15, the handle separation device being external to the rotatable component.

* * * * *